United States Patent [19]

Winstead et al.

[11] 3,719,356
[45] March 6, 1973

[54] ENGINE BLOCK STAND

[76] Inventors: Jordan D. Winstead, P.O. Box 433;
Robert B. Barnes, 228 Glendale Ave., both of Rocky Mount, N.C. 27807

[22] Filed: June 29, 1970

[21] Appl. No.: 50,861

[52] U.S. Cl. .....................269/48, 269/73, 269/292
[51] Int. Cl. ..........................B23q 1/02, B23q 3/00
[58] Field of Search............................269/15–17, 48, 269/50, 51, 73, 290–292; 408/709

[56] References Cited

UNITED STATES PATENTS

| | | | |
|---|---|---|---|
| 1,219,460 | 3/1917 | Impson | 269/17 |
| 1,445,079 | 2/1923 | Hammond | 269/50 |
| 3,508,746 | 4/1970 | Lindsay | 269/17 |
| 1,225,651 | 5/1917 | Krouse | 269/50 X |
| 3,306,601 | 2/1967 | Mitchell | 269/50 |
| 1,363,020 | 12/1920 | Saewalter | 269/51 |
| 1,220,399 | 3/1917 | Cowell | 408/709 X |

*Primary Examiner*—Robert C. Riordon
*Assistant Examiner*—Eugene F. Desmond
*Attorney*—Clarence A. O'Brien and Harvey B. Jacobson

[57] ABSTRACT

A support to be used in supporting an engine block in an elevated stationary position with its deck surface horizontally disposed and facing upwardly for mounting a boring bar assembly thereon. The support or stand includes an elongated anchor bar and a pair of horizontally spaced apart upwardly facing rest surfaces from and upon which the opposite end portions of the bar are supported. The stand further includes at least one upwardly facing support surface and is designed to support an engine block therefrom with the bar extending through main bearing journals of the block, an undersurface portion of the block resting upon the support surface and at least two of the cylinder bores of the block disposed generally vertically and opening upwardly through the deck surface. Further, the bar includes an upwardly projecting clamp stud for extending upwardly through one of the cylinder bores and use in clamping the boring bar assembly to the top deck of the engine block.

9 Claims, 6 Drawing Figures

PATENTED MAR 6 1973

Jordan D. Winstead
Robert B. Barnes
INVENTORS

BY Clarence A. O'Brien
and Harvey B. Jacobson
Attorneys

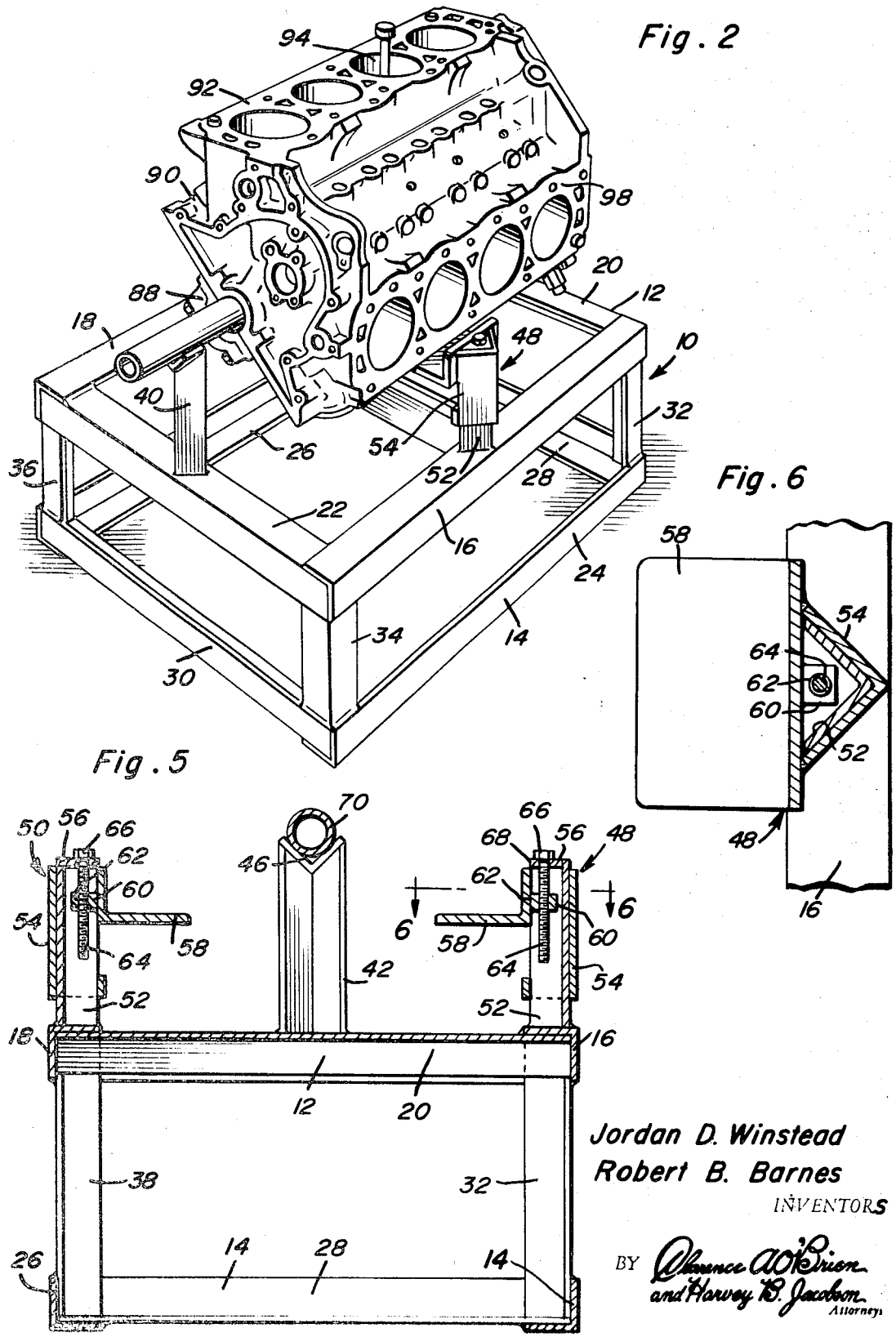

ENGINE BLOCK STAND

When automotive engines are rebuilt the cylinder bores thereof are re-bored by the use of a boring bar assembly tightly clamped in position on the top deck of the cylinder block with the rotary cutting head assembly of the boring bar assembly coaxial with the cylinder bore to be re-bored. After each cylinder bore is re-bored, the boring bar assembly is moved to a new location with the axis of rotation of the rotary cutterhead of the boring bar assembly disposed coaxial with the next cylinder bore to be re-bored.

The top deck of the engine block is utilized as a support surface for the boring bar assembly inasmuch as substantially all engine blocks are designed with their top deck surfaces disposed generally normal to the center lines of the cylinder bores opening upwardly through those top deck surfaces. Accordingly, by tightly clamping the boring bar assembly on the top deck surface of an engine block, re-boring of the cylinder bores in that engine block may be accomplished with great accuracy.

While boring bar assemblies presently in use are designed for clamping on top deck surfaces of cylinder blocks to be re-bored, the boring bar assembly comprises an elongated upright assembly of considerable mass and it is desired that the engine block to be re-bored be supported in a stationary position with its top deck surface generally horizontally disposed in order that the boring bar assembly, when clamped to the top deck surface, will be disposed in an upright position as desired.

It is accordingly the main object of this invention to provide an engine block stand which will be capable of supporting an engine block to be re-bored in stationary elevated position and with the top deck surface of the engine block horizontally disposed.

Another object of this invention, in accordance with the immediately preceding object, is to provide an engine block stand including first portions thereof specifically adapted to support in line cylinder blocks and second portions thereof adapted to support V-type engine blocks in a manner such that the supported V-type engine block may be rotated through an arc of at least 90° thereby enabling each of the two top deck surfaces of a V-type engine block to be horizontally disposed while that engine block is supported from the stand.

Another important object of this invention is to provide an engine block stand in accordance with the immediately preceding object and constructed in a manner whereby the V-type engine block supported therefrom may be angularly adjusted in its supported position in order that the top deck surfaces of V-type engine blocks wherein the cylinder banks are angularly displaced relative to each other different amounts may be supported from the stand with their top deck surfaces horizontally disposed for support of an engine block boring bar assembly therefrom.

A final object of this invention to be specifically enumerated herein is to provide an engine block stand in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a perspective view of the stand disposed in a horizontal position and with a V-type engine block supported therefrom with one cylinder bank of the V block facing upwardly with its top deck surface horizontally disposed;

FIG. 5 is an enlarged fragmentary vertical sectional view taken substantially upon the plane indicated by the section line 5—5 of FIG. 3; and FIG. 6 is an enlarged fragmentary horizontal sectional view taken substantially upon the plane indicated by the section line 6—6 of FIG. 5.

Figure 1:
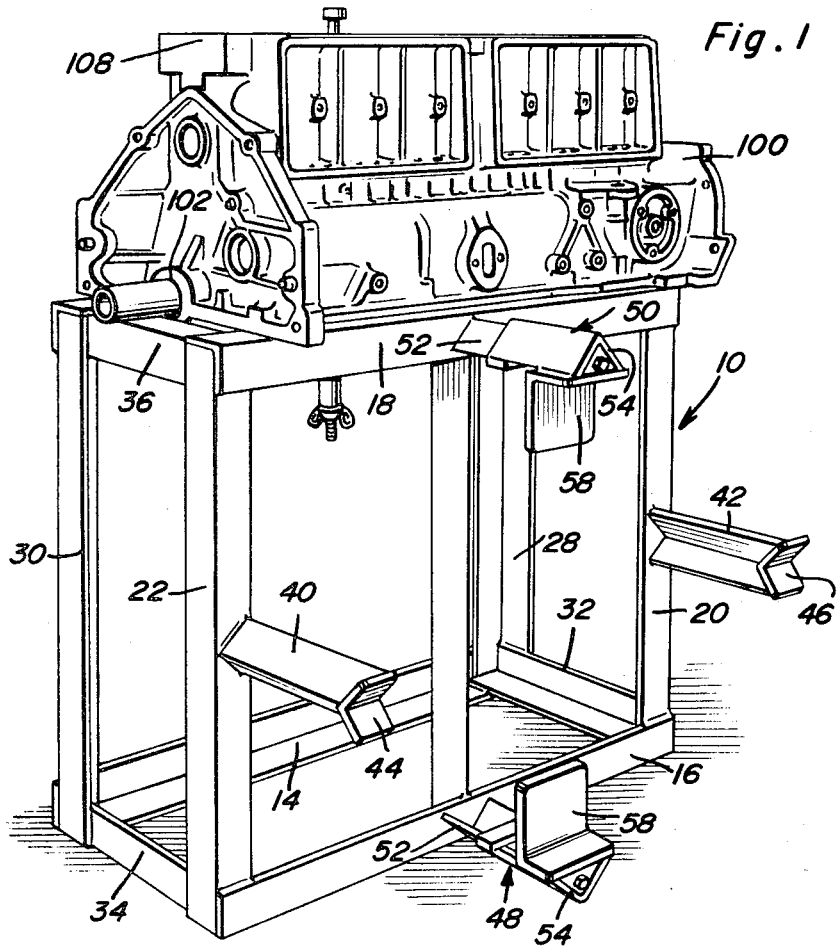
FIG. 1 is a perspective view of the engine block stand disposed on one side and with an in line cylinder block supported from the other side of the stand.
Figure 3:
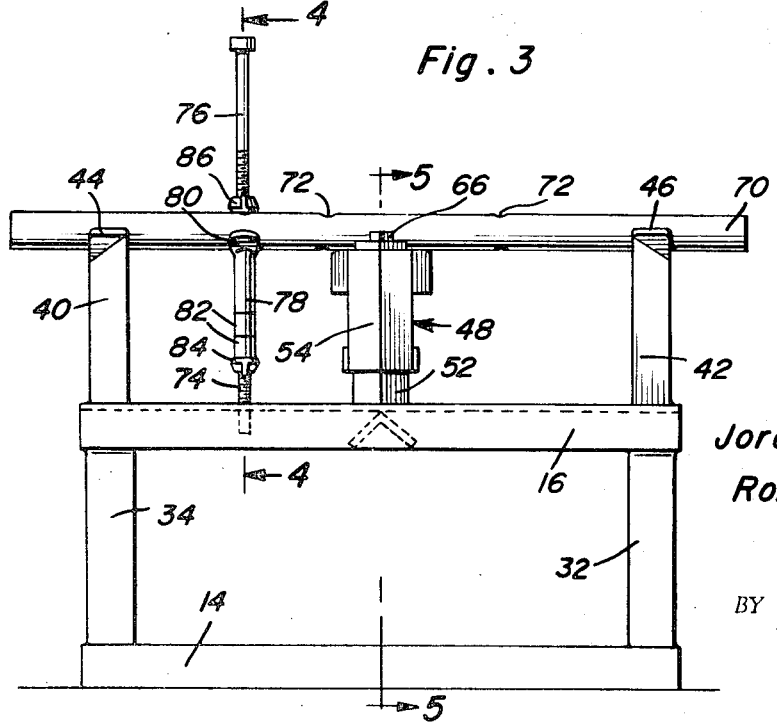
FIG. 3 is a side elevational view of the stand positioned as illustrated in FIG. 2 but with the V-type engine block removed.
Figure 4:
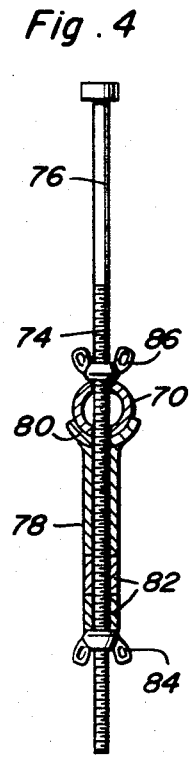
FIG. 4 is an enlarged fragmentary vertical sectional view taken substantially upon the plane indicated by the section line 4—4 of FIG. 3.

Referring now more specifically to the drawings the numeral 10 generally designates the stand of the instant invention which may be seen in FIG. 2 of the drawings to include substantially identical but inverted vertically spaced upper and lower rectangular frames 12 and 14. The frame 12 includes a pair of opposite side longitudinal angle members 16 and 18 interconnected by means of opposite end transversely extending angle members 20 and 22. The adjacent ends of the angle members 16, 18, 20 and 22 are rigidly interconnected by means of welding (not shown).

The lower frame 14 includes a similar pair of opposite side longitudinal angle members 24 and 26 interconnected by means of opposite end transversely extending angle members 28 and 30. Further, the two frames 12 and 14 are interconnected by means of four upright corner angle irons 32, 34, 36 and 38.

The opposite ends of the upper frame 12 include a pair of upright angle standards 40 and 42 including upper end V-shaped cradles 44 and 46, respectively. The V-shaped cradles 44 and 46 open upwardly and are aligned and it may be seen that the lower ends of the standards 40 and 42 project upwardly from the central portions of the transverse angle members 20 and 22 to which the lower ends of the standards 40 and 42 are secured by welding (not shown).

A pair of opposite side adjustable support assemblies 48 and 50 are provided and it may be seen from FIGS. 2, 5 and 6 of the drawings that each of the support assemblies 48 includes an upright angle member standard 52 over which a sleeve assembly 54 which is generally triangular in cross-sectional shape is telescoped. The standards 52 include upper horizontal end walls 56 and each of the sleeves 54 includes a horizontal support flange 56. In addition, each of the sleeves 54 includes a support flange 58. Each of the sleeves 54 also includes a boss 60 having a threaded bore 62 formed therethrough and the threaded shank portion 64 of a bolt or other screw member 66 is threaded through the bore 62 and rotatably received in a bore 68 formed in the end wall 66. In this manner, the bolt or screw members 66 may be rotated to raise and lower the sleeve 54 and thus the support flange 58 supported from the sleeve 54.

With attention now again invited to FIG. 2 of the drawings it may be seen that an elongated support bar, tube or pipe 70 is provided and that the bar 70 includes longitudinally spaced pairs of aligned radial bores 72. The threaded shank portion 74 of a long vertical holddown bolt or clamp screw 76 is passed through a selected pair of the apertures or bores 72 and an upstanding sleeve 78 provided with an upper end saddle or cradle 80 is telescoped upwardly over the lower end portion of the shank portion 74 after which a selected number of spacer sleeves 82 are also telescoped upwardly on the lower end of the shank portion 74. Thereafter, a threaded wing nut 84 is threaded onto the lower end of the shank portion 74. It will also be noted that a second threaded wing nut 86 is threaded on the shank portion 74 above the support bar 70 and therefore that the holddown screw or bolt 76 may be precisely longitudinally shifted relative to the support bar 70.

In operation, when it is desired to support a V-type engine block from the stand 10, the support bar 70 is passed through the main bearing journals 88 of the V-type block 90 and the opposite ends of the support bar 70 are cradled in the cradles 44 and 46. Then, the engine block 90 is rotated to a position such as that illustrated in FIG. 2 of the drawings with one of the cylinder banks disposed upright and the top deck surface 92 of that cylinder bank generally horizontally disposed. The support assembly 48 then has its bolt or screw member 66 adjusted in a manner such that the upper surface of the support flange 58 supports an undersurface of the horizontal cylinder bank portion of the block 90 from beneath. Thereafter, the holddown bolt or clamp 76 is inserted down through one of the bores 94 of the block 92 and secured through one of the pairs of aligned apertures 72. Thereafter, the boring bar assembly (not shown) to be utilized in re-boring the cylinder bores of the block 90 may be positioned on the top deck surface 92 of the block 90 and clamped down in position by means of the hold-down bolt or clamp 76. After the boring bar assembly has been properly positioned with its rotary head coaxial with the axis of one of the cylinder bores to be re-bored, the boring bar assembly may be actuated in order to re-bore that cylinder bore.

After the cylinder bores in the upstanding bank of cylinders illustrated in FIG. 2 have been re-bored, the boring bar assembly may be removed. Thereafter, the hold-down bolt or clamp 76 is removed and the block 90 is rotated 90° in a counter-clockwise direction as viewed in FIG. 2 of the drawings and the support assembly 50 is properly adjusted to maintain the block 90 in position with the other bank of cylinder bores in an upright position. Thereafter, the hold-down bolt or clamp 76 is again reapplied and secured to the bar 70 after which the boring bar assembly may be tightly clamped in selected position on the other top deck surface 98 of the block 90.

With attention now invited more specifically to FIG. 1 of the drawings it may be seen that the stand 10 has been laid on one side so that the members 14, 16, 32 and 34 define a lower horizontal frame and the members 18, 26, 36 and 38 define an upper generally horizontal frame. The upper surfaces of the members 36 and 38 serve the function of the cradles 44 and 46 and the stand 10, when disposed on its side as illustrated in FIG. 1, is adapted to support an in line engine block 100 therefrom with the bar 70 extending through the main bearing journals 102 of the block 100 and the undersurfaces of the block 100 resting upon the longitudinal members 18 and 26. Of course, inasmuch as the in line engine block 100 includes only a single bank of cylinders, it is only necessary to support the six cylinder engine block in one position. However, the elongated hold-down bolt or clamp assembly 76 may be selectively engaged in the various pairs of aligned apertures 72 in order that the boring bar assembly (not shown) to be utilized in re-boring the cylinder bores of the engine block 100 may be properly clamped in position upon the generally horizontal top deck surface 108 of the cylinder block 100.

It may thus be seen that the stand 10 may be utilized not only to support V-8 engines in alternate 90° relatively rotated positions but also to support in line cylinder blocks in upright positions. Further, the stand 10 includes a hold-down bolt or clamp assembly operative to hold a boring bar assembly in clamped down position upon either the top deck surface of an in line cylinder block or either of the top deck surfaces of a V-type cylinder block.

Inasmuch as a six cylinder engine block conventionally has longer cylinder bores than the bores of a V-8 engine block, the spacing sleeves 82 may not be utilized when the hold-down bolt or clamp 76 is used in conjunction with an in line cylinder block such as cylinder block 100. However, when the hold-down bolt or clamp assembly 76 is utilized in conjunction with a V-type cylinder block as the block 90, the length of the cylinder bores of the block 90 may be so short as to require the use of the spacing sleeves 82. In addition, utilization of the spacing sleeves 82 enable the lower wing nut 84 to be fully exposed for ready turning either by hand or by a suitable tool.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stand to be used in supporting an engine block in stationary elevated position with at least one horizontally disposed deck surface facing upwardly and at least two cylinder bores of said block opening upwardly through said deck surface, said stand including a pair of elevated horizontally spaced upwardly facing rest surfaces and a support bar having its opposite ends removably supported from said surfaces, said surfaces being spaced apart a distance to receive an engine block therebetween with said bar extending through the main bearing journals of the block, said stand further including at least one upwardly facing support surface spaced laterally to one side of a line extending between the first mentioned surfaces and adapted to support a downwardly facing lower surface of said block from beneath, and an upstanding vertically elongated lengthwise screw threadedly adjustable tension anchor assembly carried by said bar and adjustably positionable therealong intermediate its opposite ends for passing upwardly through one of the cylinder bores of said block and adapted to be used in clamping a boring bar assembly to said one deck surface with the axis of rotation of the cutting head portion of said boring bar assembly coinciding with the center axis of one of the other cylinder bores of said block.

2. The combination of claim 1 wherein said support and rest surfaces are defined by peripherally spaced surfaces of an upper generally horizontal frame portion of said stand.

3. The combination of claim 1 wherein said support and rest surfaces are defined by upstanding standards projecting upwardly from peripherally spaced portions of an upper generally horizontal frame portion of said stand.

4. The combination of claim 1 wherein said stand comprises upper and lower generally rectangular frames interconnected by means of four upright corner standards, said support and rest surfaces being defined by peripherally spaced surfaces of said upper frame, corresponding side members of said upper and lower frames and the corresponding corner posts comprising a second side frame, said stand being positionable on its side with said side frame disposed uppermost and generally horizontal, said side frame including a second set of elevated support and rest surfaces adapted to support the opposite ends of said bar and at least one undersurface portion of an engine block therefrom.

5. The combination of claim 4 wherein said support surfaces of said second set comprise aligned V-shaped trough members supported from the free ends of support standards projecting outwardly from the medial plane of said side frame.

6. The combination of claim 5 wherein said stand includes means for adjustably positioning the rest surfaces of said second set laterally of the medial plane of said side frame.

7. The combination of claim 6 wherein said side frame includes a second adjustable rest surface opposite the rest surface of said second set, said second set support surfaces being supported from a first pair of side members of said side frame and said second set rest surfaces being supported from the other pair of side members of said side frame.

8. A stand to be used in supporting an engine block, said stand including an upper generally rectangular frame having opposite end transverse members and opposite side longitudinal members, a support bar of a length to span the distance between said opposite end transverse members and supported from central portions thereof, said bar including an elongated upwardly projecting hold-down tension member, said hold-down member and said bar including coacting means for supporting said hold-down member from said bar in adjusted positions spaced longitudinally therealong and also defining a screw threaded connection between said bar and tension member for longitudinal shifting of said hold-down tension member, relative to said bar, whereby a member with which the upper end portion of said tension member is engaged may be drawn toward said bar.

9. The combination of claim 8 wherein the lower end of said tension member is externally threaded, said coacting means including longitudinally spaced upstanding bores formed in said bar through which said lower end is selectively receivable and threaded abutment means threadedly engaged with the lower end of said tension member below said bar and abutingly engageable with the underside of said bar.

* * * * *